United States Patent [19]

Aramaki et al.

[11] Patent Number: 4,908,415
[45] Date of Patent: Mar. 13, 1990

[54] METHOD OF CONVERTING FLUORINE-CONTAINING POLYMER INTO LOWER MOLECULAR WEIGHT POLYMER

[75] Inventors: Minoru Aramaki; Hisazi Nakano; Masahiro Kubo, all of Ube, Japan

[73] Assignee: Central Glass Company, Ltd., Ube, Japan

[21] Appl. No.: 127,361

[22] Filed: Dec. 2, 1987

[30] Foreign Application Priority Data

Dec. 2, 1986 [JP] Japan .................................. 61-285962

[51] Int. Cl.[4] .................................................. C08F 8/50
[52] U.S. Cl. .................................. 525/356; 525/326.4; 528/481
[58] Field of Search ........................ 525/356; 521/46.5

[56] References Cited

U.S. PATENT DOCUMENTS

| | | | |
|---|---|---|---|
| 3,067,262 | 12/1962 | Brady | 260/653.1 |
| 4,071,479 | 1/1978 | Broyde et al. | 521/46.5 |
| 4,711,949 | 12/1987 | Aramaki et al. | 525/326.4 |

FOREIGN PATENT DOCUMENTS

2167072  5/1986  United Kingdom .

Primary Examiner—Joseph L. Schofer
Assistant Examiner—Bernard Lipman
Attorney, Agent, or Firm—Fleit, Jacobson, Cohn, Price, Holman & Stern

[57] ABSTRACT

A fluoropolymer, e.g. polytetrafluoroethylene, is easily and efficiently converted into a lower molecular weight polymer in the form of a fine powder by subjecting the fluoropolymer to contact reaction with a gas comprising molecular fluorine or a suitable fluoride such as nitrogen trifluoride or xenon difluoride at a temperature between the melting temperature of the fluoropolymer and 600° C., extracting a hot reaction gas produced by the contact reaction from the reactor and cooling the extracted reaction gas to a temperature not high than 100° C. to thereby precipitate the molecular weight reduced fluoropolymer contained in the hot reaction gas as vapor.

11 Claims, 1 Drawing Sheet

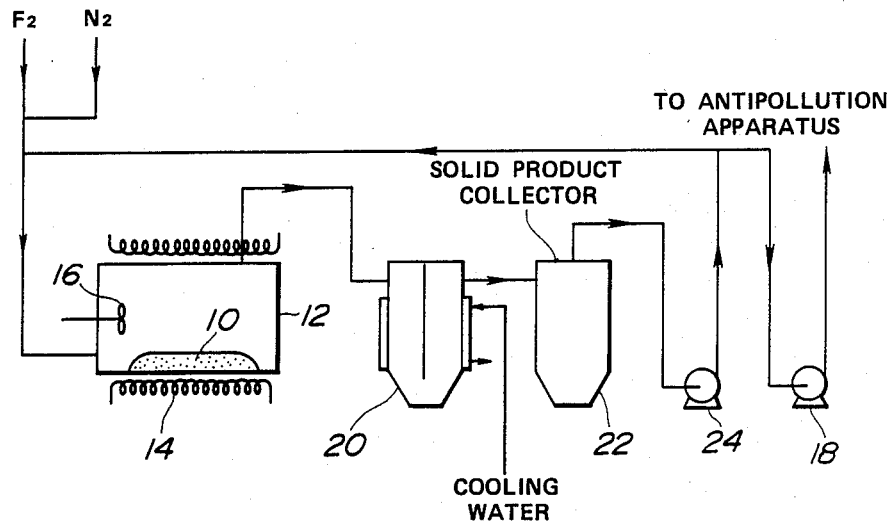

METHOD OF CONVERTING FLUORINE-CONTAINING POLYMER INTO LOWER MOLECULAR WEIGHT POLYMER

BACKGROUND OF THE INVENTION

This invention relates to a method of converting a fluorine-containing polymer such as, for example, polytetrafluoroethylene into a lower molecular weight polymer useful as a lubricating or releasing agent.

Relatively low molecular weight polymers of some fluorinated organic compounds are known for their excellent lubricity and untackiness, which are attributed to lowness of surface energy, and accordingly are used as lubricating agents and releasing agents. Polytetrafluoroethylene (PTFE) is a typical example of fluoropolymers used for such purposes.

One way to obtain PTFE of adequately low molecular weight is telomerization of tetrafluoroethylene, but this method involves several problems difficult to solve completely. For instance, it is difficult to control the reaction temperature and other items of the reaction conditions because of using the telogen also as a reaction medium, and therefore it is difficult to control molecular weight of the telomer. Besides, separation of the telomer from the telogen and the monomer is not easy.

Another way is to reduce the molecular weight of PTFE, which is prepared by a usual polymerization method, by controlled thermal decomposition in the presence of a catalytic substance or a degradation promoter. In this method a serious problem is generation of noxious gases of which disposal is very troublesome in industrial practice. Also it is known to accomplish cracking of PTFE by using radiation such as X-ray or gamma-ray. From an industrial point of view, however, using radiation is generally unwelcome because it is troublesome and costly.

GB-A 2,167,072 shows reducing the molecular weight of a fluorine-containing high polymer, which may be PTFE, by contact reaction of the polymer with a gas comprising a fluorine source at an elevated temperature. The fluorine source is selected from molecular fluorine, fluorides of halogens, fluorides of rare gas elements and nitrogen fluorides. In this method it is relatively easy to control the degree of reduction of the molecular weight, and by-products of the polymer decomposing reaction are entirely or mostly harmless substances. However, by this method it is difficult to reduce the molecular weight to below about 5000. Besides, usually the product of this method is in the form of a mass of wax, so that a pulverizing operation is needed to obtain a powder of a low molecular weight fluoropolymer.

SUMMARY OF THE INVENTION

It is an object of the present invention to provide a method of easily converting a fluorine-containing polymer, which may be PTFE, into a lower molecular weight polymer in the form of a fine powder.

According to the invention the above object is accomplished by a method comprising the steps of in a reactor heating a fluorine-containing polymer to a temperature not lower than the melting temperature of the polymer and not higher than 600° C. and subjecting the heated polymer to contact reaction with a gas comprising at least one fluorine source material selected from molecular fluorine, nitrogen trifluoride, halogen fluorides and fluorides of rare gas elements while maintaining gas phase in the reactor at a temperature in the range from 200° to 55° C. extracting a hot reaction gas produced by the contact reaction from the reactor, and cooling the extracted reaction gas to a temperature not higher than 100° C.

A fluorine-containing polymer or fluoropolymer adequately low in molecular weight readily vaporizes at a temperature close to its melting temperature. In the method according to the invention the reaction between the starting fluoropolymer and a fluorine source gas is carried out at a temperature not lower than the melting temperature of the starting fluoropolymer and, hence, higher than the melting temperature of the molecular weight reduced fluoropolymer. Therefore, during the reaction the molecular weight reduced fluoropolymer exists in gas phase. By extracting the hot gas phase containing the molecular weight reduced fluoropolymer from the reactor and cooling the extracted gas phase to 100° C. or below, the molecular weight reduced fluoropolymer is obtained in the form of fine powder.

In the method according to the invention the fluorine source gas provides fluorine radical which is highly active and serves the function of breaking the molecular chain of the starting fluoropolymer. Furthermore, coupling of fluorine radical with the terminal radicals of the molecular weight reduced polymer results in existence of —$CF_3$ group at the ends of the molecular chain of the obtained fluoropolymer. Therefore, low molecular weight fluoropolymers obtained by this method are very stable.

In the reaction between the starting fluoropolymer and the gas which serves as a strong fluorinating agent, gaseous by-products are relatively small in quantity and are entirely or mostly harmless substances. Usually the by-products include low-carbon fluorocarbons such as $CF_4$, $C_2F_6$ and $C_3F_8$ and, depending on the kind of the fluorine source gas, may include some halogenated hydrocarbons. In this regard it is preferable to use a mixture of either molecular fluorine or nitrogen fluoride and an inactive gas such as nitrogen. Free carbon is not liberated by the polymer chain breaking reaction, so that a snow-white product is obtained.

Low molecular weight fluoropolymers obtained by this method are usually in the form of very fine particles which are spherical or flaky. The particle size of the product can be varied over a fairly wide range, e.g. from about 0.1μm to about 20μm, by controlling the rate of cooling of the reaction gas containing vapor of the molecular weight reduced polymer. The particle size of the solid product becomes smaller as the cooling rate is made higher. In some cases, depending on the class of the starting fluoropolymer and the reaction conditions, a liquid fluoropolymer of lower molecular weight can be obtained by the same method.

BRIEF DESCRIPTION OF THE DRAWING

The single FIG. is a diagrammatic illustration of an example of reaction apparatus for the method according to the invention.

DESCRIPTION OF THE PREFERRED EMBODIMENTS

This invention is applicable to various fluoropolymers. Examples of suitable fluoropolymers are PTFE, copolymer of ethylene and tetrafluoroethylene (TFE), copolymer of TFE and hexafluoropropylene, copolymer of TFE and a perfluoroalkoxyethylene, polychlorotrifluoroethylene (PCTFE), polyvinylidene fluoride and polyvinyl fluoride. As the starting material in the method according to the invention the fluorpolymer may be in any form: not only small particles and pellets but also sheets and irregularly shaped scraps can be used. The starting fluoropolymer may be a practical resin containing a filler. In advance of reducing molecular weight by the method according to the invention, the molecular weight of the starting fluoropolymer may be reduced to some extent by a known method with a view to enhancing the rate of reaction with a fluorine source gas and increasing the yield of a desired low molecular weight fluoropolymer.

In this invention a fluorine source material can be selected from fluorine gas and some kinds of inorganic fluorine compounds as mentioned hereinbefore. Examples of useful halogen fluorides are chlorine monofluoride ClF, chlorine trifluoride $ClF_3$, bromine trifluoride $BrF_3$, bromine pentafluoride $BrF_5$, iodine trifluoride $IF_3$, iodine pentafluoride $IF_5$ and iodine heptafluoride $IF_7$. Typical examples of rare gas fluorides are krypton difluoride $KrF_2$ and xenon difluoride $XeF_2$. Nitrogen trifluoride $NF_3$ is very convenient for practical operation because this compound is a stable gas at room temperature and also because when this fluoride is used no halogen other than F attaches to the ends of molecular chains of the molecular weight reduced fluoropolymers. Of course nitrogen fluoride is cheaper than rare gas fluorides. In any case the fluorine source gas is usually diluted with nitrogen gas or an alternative inactive gas such as argon, helium or carbon tetrafluoride.

The quantity of the fluorine source gas to be brought into contact with a given quantity of the starting fluoropolymer is variable depending mainly on the kind and physical form of the fluoropolymer and the desired degree of reduction in molecular weight of the polymer. During the reaction the minimum quantity of the fluorine source gas required to be present in the reaction system containing 100 parts by weight of the starting fluoropolymer is 0.01 part by weight, calculated as F. The presence of an excessively large amount of fluorine source gas will cause an excessive reduction of the molecular weight of the polymer. Usually it is suitable that up to about 10 parts by weight of fluorine source gas (calculated as F) coexists with 100 parts by weight of the fluoropolymer to be decomposed.

In carrying out the polymer molecular weight reducing reaction the starting fluropolymer is kept heated at a temperature not lower than its melting temperature and not higher than 600° C., and the gas phase containing the fluorine source material is maintained at a temperature in the range from 200° to 550° C. and preferably slightly lower than the temperature of the fluoropolymer. The reaction takes a very long time if the temperature of the fluoropolymer is below its melting temperature, and the molecular weight reduced fluoropolymer does not readily vaporize if the temperature of the gas phase in the reactor is below 200° C. On the other hand, if the starting fluoropolymer is heated to above 600° C. and/or the temperature of the gas phase is raised to above 550° C., it is difficult to obtain a low molecular weight fluoropolymer at good yield because of decomposition of a considerable portion of the low weight fluoropolymer in the reaction gas.

The above described reaction can be carried out in a reactor of any type insofar as the reactor is suited to gas-solid contact reactions. For example, it is suitable to use a reactor of a forced gas recirculation type having many shelves or trays in multi-deck arrangement or a reactor of a fluidized bed type. The rate of the reaction can be enhanced by raising the gas pressure in the reactor, though the reaction proceeds at a practically satisfactory rate even under the atmospheric pressure.

To obtain a low molecular weight fluoropolymer at good yield and in a fine powder form, the hot reaction gas produced by the above described gas-solid contact reaction is cooled to a temperature not higher than 100° C. and preferably not lower than room temperature to thereby precipitate the molecular weight reduced fluoropolymer. For this purpose the reactor is connected with a cooler which is connected with a gas-solid separator or a solid matter collector. It is possible to use a single chamber both as a cooler and as a separator or collector. The cooling medium may be air, water, organic cooling medium or liquidfied gas. The particle size of the precipitated low molecular weight fluoropolymer can be controlled by controlling the rate of cooling the reaction gas. The separator or collector is, for example, of a settling chamber type using gravitational force, of a collision plate or guide plate type using inertial force or of a cyclon type or bug filter type using centrifugal force. For efficient separation and collection of the precipitated particles of the low molecular weight fluoropolymer, it is important that the linear velocity of the reaction gas in the separator or collector be as low as possible.

The reaction apparatus needs to include pumps, blowers and/or fans transferring the reaction gas into the cooler and then into the separator or collector and, after separating and collecting the precipitated fluoropolymer, for returning the gas phase to the reactor. The capacities of the pumps, blowers and/or fans should be such that the hot reaction gas can be extracted, preferably continuously, from the reactor before decomposition of the molecular weight reduced fluoropolymer existing in the gas. If the reaction gas is extracted too slowly a considerable portion of the molecular weight reduced polymer decomposes within the reactor. On the other hand, extracting the reaction gas at an excessively high rate worsens the heat efficiency of the reactor. It is suitable that the volume of the reaction gas extracted in every minute is nearly equal to the interior volume of the reactor.

The invention is further illustrated by the following nonlimitative examples.

EXAMPLE 1

A nickel tube about 25 mm in diameter and 1 m in length was used as a reactor. The tube was kept heated at 500° C., and a mixture of 5% of fluorine gas and 95% of nitrogen gas was continuously introduced into the tube at a rate of 1 l/min. Simultaneously, pulverized PTFE having molecular weight of about 8500 was continuously introduced into the tube at a rate of 20 g/hr. The PTFE powder had a mean particle size of about 0.6 mm. Using a pump the reaction gas was continuously extracted from the reactor at a rate of 30–50 l/min and cooled to about 40° C. to thereby precipitate molecular weight reduced PTFE. After separating the precipitated polymer the gas was recycled to the reactor. These operations were continued for 4 hr. As the result 40 g of a fine, snow-white powder of PTFE was collected. That is, the yield of the molecular weight reduced PTFE was 50%. In this powder the particle size was 0.1–1 $\mu$m. The obtained PTFE powder had a melting point of 286° C., and the molecular weight of this polymer was calculated to be 2300 from the following relationship between melting point ($T_m$) and molecular weight (MW), shown in U.S. Pat. No. 3,067,262.

$$M = \frac{200}{685[1/T_m(°K.) - 1/600]}$$

EXAMPLE 2

The starting material was 5 mm cubic pellets of PTFE having a molecular weight of about 8500. Referring to the FIGURE, 2 kg of the PTFE pellets 10 was charged in a reactor 12 which had a capacity of 60 liters and was provided with heaters 14 and a fan 16 for agitation of gas atmosphere. The material of the reactor 12 was nickel. A mixture of 5% of fluorine gas and 95% of nitrogen gas was continuously introduced into the reactor 12 at a rate of 1 1/min while the interior of the reactor 12 was kept heated at 500° C. The gas pressure in the reactor 12 was maintained at the atmospheric pressure by operating a vacuum pump 18 to decrease the feed of the fluorine-nitrogen mixed gas according to the need. A reaction gas produced by reaction of the PTFE pellets 10 with fluorine gas was continuously extracted from the reactor 12 at a rate of 30–50 1/hr by operating a pump 24. The extracted reaction gas was introduced into a cooler 20, wherein the gas was cooled to about 40° C. for precipitation of the molecular weight reduced PTFE, and the precipitated PTFE was separated from the gas phase and collected in a collector 22. The gas phase was recycled to the reactor 12. Continuing such operation for 10 hr, 320 g of a fine, white powder of low molecular weight PTFE was obtained, so that the yield at this stage was 40%. This powder was smaller than 0.5μm in particle size. The PTFE in fine powder form had a melting point of 265° C. and an molecular weight of 1500. The above described operation was continued for additional 14 hr (24 hr in total), and the yield of the low molecular weight PTFE powder reached 85%.

EXAMPLE 3

Using the same apparatus, 2 kg of the aforementioned PTFE pellets was treated in the same manner as in Example 2 except that the temperature in the reactor 12 was raised to 570° C. In 5 hr, 150 g of a white, fine powder of molecular weight reduced PTFE was obtained, so that the yield at this stage was 21%. The powder was smaller than in 0.5μm in particle size. The PTFE in fine powder form had a melting point of 265° C. and an average molecular weight of 1500. The operation was continued for additional 7 hr (12 hr in total), and the yield of the low molecular weight PTFE powder reached 38%.

EXAMPLE 4

Using the same apparatus 2 kg of the aforementioned PTFE pellets was charged in the reactor, and a mixture of 5% of ClF$_3$ gas and 95% of nitrogen gas was continuously introduced into the reactor at a rate of 1 1/min while the inferior of the reactor was kept heated at 520° C. The reaction gas was extracted and treated in the same manner as in Example 2. In 10 hr, 300 g of a white, fine powder of low molecular weight PTFE was obtained, so that the yield at this stage was 36%. The powder was smaller than 0.5μm in particle size. The PTFE in fine powder form had a melting point of 267° C. and an average molecular weight of 1600.

EXAMPLE 5

A copolymer of TFE and hexafluoropropylene (HFP) in the form of 5 mm cubic pellets was used as the starting fluoropolymer. By the same method and under the same conditions as in Example 2, 1 kg of the TFE-HFP copolymer pellets was reacted with fluorine for 5 hr. As the result 150 g of a white, fine powder of low molecular weight TFE-HFP copolymer was obtained, so that the yield at this stage was 60%. This copolymer powder was smaller than 0.5μm in particle size and had a melting point of 235° C.

EXAMPLE 6

A copolymer of TPE and a perfluoroalkoxyethylene (PFAE) in the form of pellets 3 mm in diameter and 5 mm in length was used as the starting fluoropolymer. By the same method and under the same condition as in Example 2, 1 kg of the TFE-PFAE copolymer pellets was reacted with fluorine for 6 hrs. The reaction gas was extracted and treated in the same manner as in Example 2. As the result 160 g of a white, fine powder of low molecular weight TFE-PFAE copolymer was obtained, so that the yield at this stage was 34%. This copolymer powder was smaller than 0.5μm in particle size and had a melting point of 248° C.

EXAMPLE 7

Using the same apparatus 2 kg of the aforementioned PTFE pellets was charged in the reactor, and a mixture of 50% of NF$_3$ gas and 50% of nitrogen gas was continuously introduced into the reactor at a rate of 1 1/min while the interior of the reactor was kept heated at 500° C. The reaction gas was extracted and treated in the same manner as in Example 2. In 12 hr, 330 g of a white, fine powder of low molecular weight PTFE was obtained, so that the yield at this stage was 55%. The powder was smaller than 0.5μm in particle size. The PTFE in fine powder form had a melting point of 265° C. and an average molecular weight of 1500. The operation was continued for additional 12 hr (24 hr in total), and the yield of the low molecular weight PTFE powder reached 87%.

EXAMPLE 8

Using the same apparatus 2 kg of the aforementioned PTFE pellets was charged in the reactor, and a mixture of 10% of XeF$_2$ gas and 90% of nitrogen gas was continuously introduced into the reactor at a rate of 1 1/min while the interior of the reactor was kept heated at 500° C. The reaction gas was extracted and treated in the same manner as in Example 2. In 8 hr, 310 g of a white, fine powder of low molecular weight PTFE was obtained, so that the yield at this stage was 38%. The powder was smaller than 0.5μm in particle size. The PTFE in fine powder form had a melting point of 267° C. and an average molecular weight of 1600.

EVALUATION TEST 1

The low molecular weight PTFE powders obtained in examples 1–4 were subjected to a friction test using a friction tester of the Bowden-Leben type. For comparison, a low molecular weight PTFE powder obtained by telomerization, a low molecular weight PTFE powder obtained by radiation treatment of PTFE, a molybdenum disulfide powder sold as a lubricating or releasing agent and a graphite powder on the market were subjected to the same test.

Each sample powder was rubbed against the surface of an aluminum plate polished with #400 sand paper with a steel ball having a diameter of 8 mm. The load was 1000 g, and the fricing speed was 0.14 m/min. The results were shown in Table 1.

TABLE 1

| Sample | Coefficient of Friction |
| --- | --- |
| PTFE powder of Example 1 | 0.035 |
| PTFE powder of Example 2 | 0.030 |
| PTFE powder of Example 3 | 0.031 |
| PTFE powder of Example 4 | 0.032 |
| PTFE powder obtained by telomerization | 0.075 |
| PTFE powder obtained by radiation treatment | 0.085 |
| molybdenum disulfide powder | 0.15 |
| graphite powder | 0.16 |

EVALUATION TEST 2

The low molecular weight PTFE powder obtained in Example 2 was added to polyacetal and, separately, to polycarbonate. In either of the resultant mixtures the content of the PTFE powder was 10 wt %. By injection molding the two kinds of mixtures were each formed into plate-shaped specimens, which were subjected to friction test using the Bowden-Leben type tester. Each specimen was rubbed against the surface of an aluminum plate polished with #600 sand paper with a steel ball having a diameter of 8 mm. The friction speed was 0.14 m/min, and the load was 1000 g in the case of the polyacetal specimens and 500 g in the case of the polycarbonate specimens. For comparison, the aforementioned PTFE powder obtained by telomerization, PTFE powder obtained by radiation treatment and graphite powder were tested in the same manner. The results are shown in Table 2.

TABLE 2

| Resin | Lubricating Agent | Coefficient of Friction |
| --- | --- | --- |
| polyacetal | blank | 0.20 |
| | PTFE powder of Example 2 | 0.05 |
| | PTFE powder obtained by telomerization | 0.09 |
| | PTFE powder obtained by radiation treatment | 0.10 |
| | graphite powder | 0.22 |
| polycarbonate | blank | 0.50 |
| | PTFE powder of Example 2 | 0.06 |
| | PTFE powder obtained by telomerization | 0.10 |
| | PTFE powder obtained by radiation treatment | 0.15 |
| | graphite powder | 0.50 |

EVALUATION TEST 3

Each of the four kinds of powders used in Test 2 was added and well mixed with a petroleum oil to obtain a dispersion containing 10 wt % of powder. Each dispersion was subjected to a lubricity test by the Soda's four-ball method. The results are shown in Table 3.

TABLE 3

| Lubricating Agent | Seizing Load (kg) | Coefficient of Friction | Limit Load (kg/cm$^2$) |
| --- | --- | --- | --- |
| blank | 68.3 | 0.108 | 429 |
| PTFE powder of Ex. 2 | 280.1 | 0.055 | 991 |

TABLE 3-continued

| Lubricating Agent | Seizing Load (kg) | Coefficient of Friction | Limit Load (kg/cm$^2$) |
| --- | --- | --- | --- |
| PTFE powder obtained by telomerization | 160.5 | 0.095 | 570 |
| PTFE powder obtained by radiation treatment | 154.7 | 0.095 | 557 |
| graphite powder | 94.8 | 0.098 | 443 |

What is claimed is:

1. A method of converting a fluorine-containing solid polymer into a lower molecular weight polymer in the form of fine particles, comprising the steps of:
   heating a fluorine-containing solid polymer in a reactor to a temperature not lower than the melting temperature of the fluorine-containing polymer and not higher than 600° C. and subjecting the heated fluorine-containing polymer to contact reaction with a fluorinating gas while maintaining the gas phase in the reactor at a temperature in the range from 200° to 550° C. such that a lower molecular weight polymer is formed by reaction of the fluorinating gas with the fluorine-containing polymer and a major portion of the lower molecular weight polymer exists as a gas phase in a hot reaction gas produced by the contact reaction, said fluorinating gas comprising at least one fluorine source material selected from the group consisting of molecular fluorine, nitrogen trifluoride, halogen fluorides and fluorides of rare gas elements;
   extracting said hot reaction gas from the reactor; and
   cooling the extracted reaction gas to a temperature not higher than 100° C. thereby precipitating submicron particles of the lower molecular weight polymer from the reaction gas.

2. A method according to claim 1, wherein said reaction gas is continuously extracted from said reactor while said contact reaction is carried out.

3. A method according to claim 2, wherein said fluorinating gas is continuously introduced into said reactor such that said fluorinating gas existing in said reactor comprises 0.01 to 10 parts by weight of fluorine atoms per 100 parts by weight of said fluorine-containing polymer existing in said reactor.

4. A method according to claim 1, wherein said reaction gas extracted from said reactor is cooled to a temperature not higher than room temperature.

5. A method according to claim 1, wherein said fluorinating gas comprises at least one halogen fluoride selected from the group consisting of ClF, ClF$_3$, BrF$_3$, BrF$_5$, IF$_3$, IF$_5$ and IF$_7$.

6. A method according to claim 1, wherein said fluorinating gas comprises at least one fluoride of rare gas element selected from the group consisting of KrF$_2$ and XeF$_2$.

7. A method according to claim 1, wherein said fluorinating gas comprises an inactive gas.

8. A method according to claim 1, wherein said fluorinating gas is a mixture of fluorine gas and nitrogen gas.

9. A method according to claim 1, wherein said fluorinating gas is a mixture of nitrogen trifluoride gas and nitrogen gas.

10. A method according to claim 1, wherein said fluorine-containing polymer is selected from the group consisting of polytetrafluoroethylene, polychlorotrifluoroethylene, polyvinylidene fluoride, polyvinyl fluoride, copolymers of ethylene and tetrafluoroethylene, copolymers of tetrafluoroethylene and hexafluoropropylene and copolymers of tetrafluoroethylene and perfluoroalkoxyethylene.

11. A method according to claim 1, wherein the fluorine-containing solid polymer is heated to a temperature in the range from 500° to 570° C. in the reactor.

* * * * *